(12) United States Patent
Wendte et al.

(10) Patent No.: US 8,770,612 B2
(45) Date of Patent: Jul. 8, 2014

(54) AUTOMATIC TRACTOR HITCH SYSTEM FOR TRAILING IMPLEMENTS

(75) Inventors: Keith W. Wendte, Willowbrook, IL (US); Tracey D. Meiners, Mackinaw, IL (US); Charles B. Merriken, Peoria Heights, IL (US); Brian R. Krug, Eureka, IL (US); Garrett R. Rausch, Hawthorn Woods, IL (US); Bruce R. Vahling, Urbana, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/451,151

(22) Filed: Apr. 19, 2012

(65) Prior Publication Data

US 2013/0277943 A1 Oct. 24, 2013

(51) Int. Cl.
*B60D 1/64* (2006.01)

(52) U.S. Cl.
USPC ............................ 280/421; 280/420; 280/422

(58) Field of Classification Search
USPC .................................................. 280/420–422
See application file for complete search history.

(56) References Cited

U.S. PATENT DOCUMENTS

| | | | |
|---|---|---|---|
| 2,062,806 A | 12/1936 | Casler | |
| 2,457,478 A * | 12/1948 | Letvin | 280/421 |
| 3,888,513 A * | 6/1975 | Pilz et al. | 280/421 |
| 4,111,452 A | 9/1978 | Carlsson | |
| 4,253,680 A | 3/1981 | Albright et al. | |
| 4,368,899 A | 1/1983 | Smalley et al. | |
| 4,389,058 A | 6/1983 | Cadwell | |
| 4,738,463 A | 4/1988 | Poore et al. | |
| 4,763,743 A | 8/1988 | Ridgway | |
| 4,807,714 A | 2/1989 | Blau et al. | |
| 5,193,838 A | 3/1993 | Olson | |
| 5,346,239 A * | 9/1994 | Wohlhuter | 280/420 |
| 5,458,357 A * | 10/1995 | Wohlhuter | 280/420 |
| 6,863,538 B2 | 3/2005 | Mattern et al. | |
| 7,258,559 B2 * | 8/2007 | Mattern et al. | 439/248 |
| 7,290,977 B2 * | 11/2007 | Albright et al. | 414/723 |
| 2011/0037241 A1 | 2/2011 | Temple et al. | |

FOREIGN PATENT DOCUMENTS

| | | |
|---|---|---|
| EP | 434472 A1 | 2/1990 |
| FR | 2641502 | 1/1989 |

* cited by examiner

*Primary Examiner* — Kevin Hurley
*Assistant Examiner* — Michael Stabley
(74) *Attorney, Agent, or Firm* — Rebecca L. Henkel (57) ABSTRACT

A hitch system for automatically hitching a tractor to a trailing implement is provided. The hitch system may allow an operator that is in a cab of the tractor to remotely connect and electrical system and/or a hydraulic system of a tractor an implement to each other and to remotely secure a hitch pin that connects a tongue of the implement to a drawbar of the tractor. The hitch system may include implement and tractor connector bank assemblies that are respectively provided on the implement and tractor. The tractor connector bank assembly may be moveable in multiple directions for allowing the tractor connector bank assembly to be remotely controlled from the cab of the tractor to align and move into engagement with the implement connector bank assembly.

20 Claims, 3 Drawing Sheets

AUTOMATIC TRACTOR HITCH SYSTEM FOR TRAILING IMPLEMENTS

BACKGROUND OF THE INVENTION

The present invention relates generally to agricultural vehicles and, more particularly, to hitching systems that connect agricultural tractors and trailing implements that are towed behind tractors.

Agricultural tractors are used to tow trailing implements such as ground working or harvesting implements through agricultural fields and bulk carriers such as wagons through fields and on the road. Hitching a trailing implement to a tractor can be tedious, tiring, and time-consuming. Current hitching procedures require an operator to get out of and back into a cab of a tractor, at times repeatedly, to visually inspect and manipulate and connect components of the trailing implement tractor. While hitching, a height of a tongue of the trailing implement needs to be adjusted to match a height of a drawbar of the tractor, the tractor needs to be maneuvered so that the tongue of the trailing implement and the drawbar of the tractor are aligned, a hitch pin needs to be inserted through the tongue of the trailing implement and the drawbar of the tractor, and electrical and hydraulic systems of the trailing implement and tractor need to be connected to each other. A typical way of reducing the amount of times that operators have to get out of and back into the cab of the tractor to perform these procedures is to have a second person stand behind the tractor to assist with or perform many of these procedures.

SUMMARY OF THE INVENTION

The present invention is directed to a hitch system for automatically hitching a tractor to a trailing implement. The hitch system may allow an operator that is in a cab of the tractor to remotely connect tractor and implement electrical and hydraulic systems to each other and to remotely secure a hitch pin that connects a tongue of the implement to a drawbar of the tractor. The system may provide controls for remotely moving system components from inside of the cab so that alignment and connection of system components can be done without entirely relying on tractor maneuvering and requiring an operator to manually make connections.

The hitch system may include implement and tractor connector bank assemblies that are respectively provided on the implement and tractor. The tractor connector bank assembly may be moveable in multiple directions for allowing the tractor connector bank assembly to be remotely controlled from the cab of the tractor to align and move into engagement with the implement connector bank assembly.

According to one aspect of the invention, a hitch system for automatically hitching a tractor to a trailing implement is provided. The system may include an implement connector bank assembly that has an electrical connector and/or a hydraulic connector that are respectively connected to an electrical system and a hydraulic system of an implement that can be hitched to and trail behind a tractor. A tractor connector bank assembly includes an electrical connector and/or a hydraulic connector that are respectively connected to an electrical system and a hydraulic system of the tractor. An actuator assembly that can be operated remotely may be arranged between the tractor and the tractor connector bank so as to move the tractor connector bank assembly along a first movement path, and a second movement path that is different from the first movement path. The first and second movement paths of the tractor connector bank assembly may be generally orthogonal with respect to each other. The first movement path may extend in a generally vertical direction and the second movement path may extend in a generally horizontal direction. This may allow an operator to remotely move components of the trailing implement and/or tractor systems into alignment and connection with each other, without leaving the cab of the tractor.

According to another aspect of the invention, the actuator assembly may include a first actuator connected to the tractor connector bank assembly and that has a lowered position in which the tractor connector bank assembly is spaced relatively closer to a ground surface supporting the tractor and a raised position in which the tractor connector bank assembly is spaced relatively further from the ground surface supporting the tractor. The actuator assembly may include a second actuator connected to the tractor connector bank assembly and that has an inward position in which the tractor connector bank assembly is spaced relatively closer to the tractor and an outward position in which the tractor connector bank assembly is spaced relatively further from the tractor. This may allow for remotely controlled movement of the tractor connector bank assembly.

According to another aspect of the invention, an implement support may be arranged between a tongue of the trailing implement and the implement connector bank assembly. The implement support may include an implement bank frame that holds the implement connector bank assembly and a telescoping mount that interconnects the bank frame and the implement, and allows the implement bank frame to move in a generally vertical direction. The implement support may include a post having a first end that is connected to the tongue of the trailing implement and a collar that can move in a longitudinal direction along the post. The implement bank frame may be connected to the collar for moving along the post and a spring may bias the implement back frame to an intermediate position between upper and lower ends of the post. Sliders may be arranged between the collar and the implement bank frame to allow the implement bank to move closer to or further from the post of the telescoping mount. A pivot that may include a resilient material that self-centers or self-supports the pivot in a default position may be arranged between the collar and the implement bank frame for allowing the implement bank frame to pivot with respect to the post of the telescoping mount. This may allow the implement connector bank assembly to be held in a default position but be movable to other positions and orientations during hitching procedures while being engaged by the tractor implement connector bank.

According to another aspect of the invention, a lock may be arranged between the implement and tractor connector bank assemblies. The lock may have an unlocked position in which the implement and tractor connector bank assemblies are moveable with respect to each other and a locked position in which the implement and tractor connector bank assemblies are clamped against and held in engagement with each other. The lock may include a clasp that pivots about an axis to draw the implement and tractor connector bank assemblies toward each other and an electric motor that drives the clasp to pivot about the axis. A pair of pins and a pair of receptacles that may be cone-shaped can provide mechanical alignment of the implement and tractor connector bank assemblies before and during engagement of the implement and tractor connector bank assemblies. This may allow for automatic alignment and connection of the implement and tractor connector bank assemblies while movement of the tractor connector bank assembly is remotely controlled by an operator from within the cab of the tractor. This may allow for connection of the electrical and hydraulic systems of the trailing implement and tractor so that a height of the tongue of the trailing implement may be adjusted remotely by remotely controlling an electric or hydraulic tongue jack of the trailing implement to match a height of the drawbar of the tractor. The tractor may then be backed up so that the tongue of the trailing implement and the drawbar of the tractor align with each other, and a hitch pin that is moved by an actuator may be remotely controlled by the operator within the cab of the tractor to secure the pin through the tongue of the trailing implement and the drawbar of the tractor, connecting them to each other.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DETAILED DESCRIPTION

Figure 1:
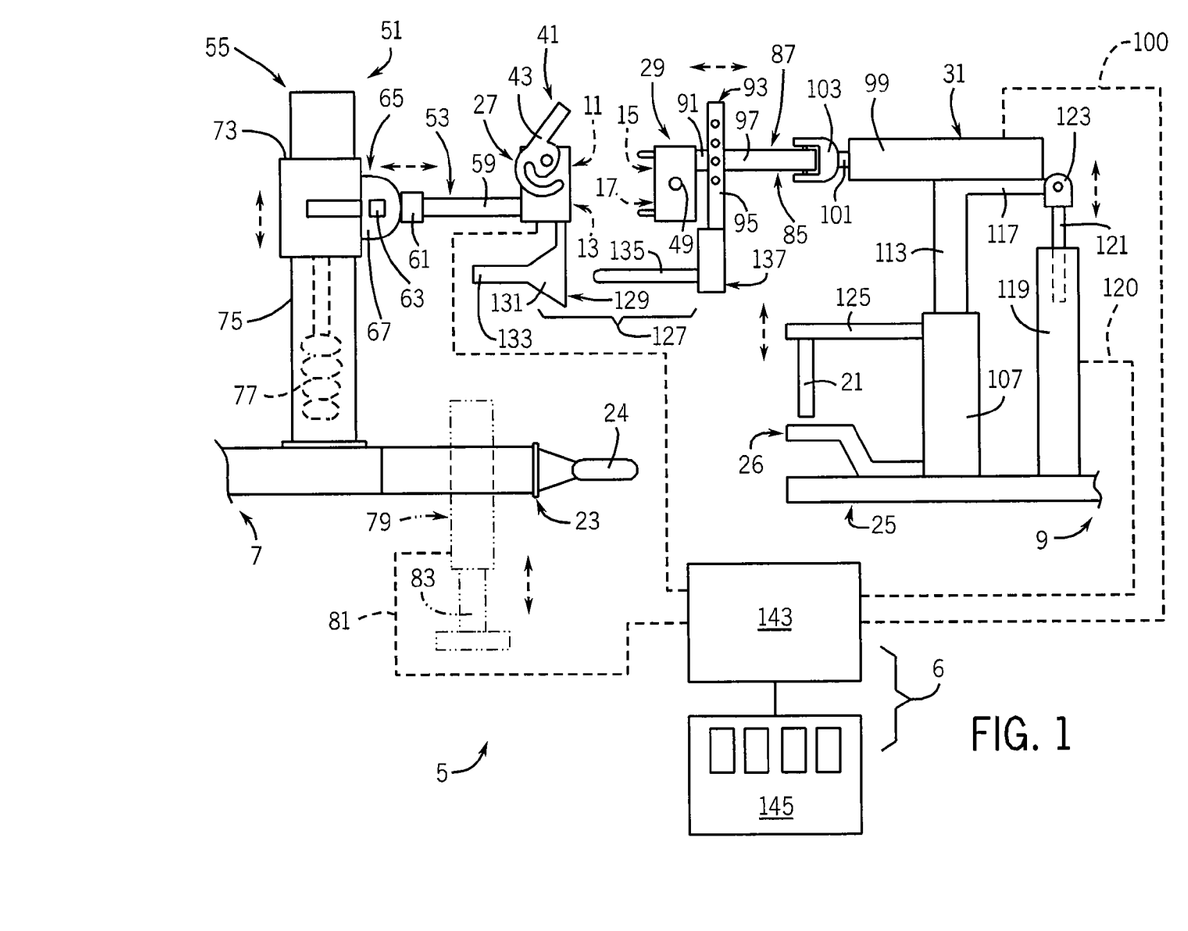
FIG. 1 is a partially schematic simplified side elevation view of a hitch system according to the invention.

Referring to FIG. 1, a hitch system 5 is shown that is used with a trailing implement 7 and a tractor 9 that will tow the trailing implement 7. The hitch system 5 allows an operator to automatically align and remotely connect an implement electrical system 11 and an implement hydraulic system 13 to a tractor electrical system 15 and a tractor hydraulic system 17, respectively, and to remotely secure a hitch pin 21 through a tongue 23 of the trailing implement 7 and a drawbar 25 of the tractor 9, while the operator remains in a cab of the tractor 9. This can be done from the cab of the tractor 9 by way of a control system 6, as explained in greater detail elsewhere herein.

Still referring to FIG. 1, hitch system 5 includes an implement connector bank assembly 27 that provides a coupling interface(s) for the implement hydraulic and/or electrical systems 11, 13 and that is supported on the tongue 23 of the trailing implement 7. A tractor connector bank assembly 29 that provides a coupling interface(s) for the tractor electrical and/or hydraulic systems 15, 17 is supported by the drawbar 25 of the tractor 9. An actuator assembly 31 is arranged between the tractor connector bank assembly 29 and the drawbar 25 of the tractor 9 and is adapted to be controlled remotely to move the tractor connector bank assembly 29 generally vertical or up and down and generally horizontal or fore and aft to align with and engage the implement connector bank assembly 27. For example, the generally vertical and horizontal movements may be within about 30 degrees of truly vertical or horizontal.

Figure 2:
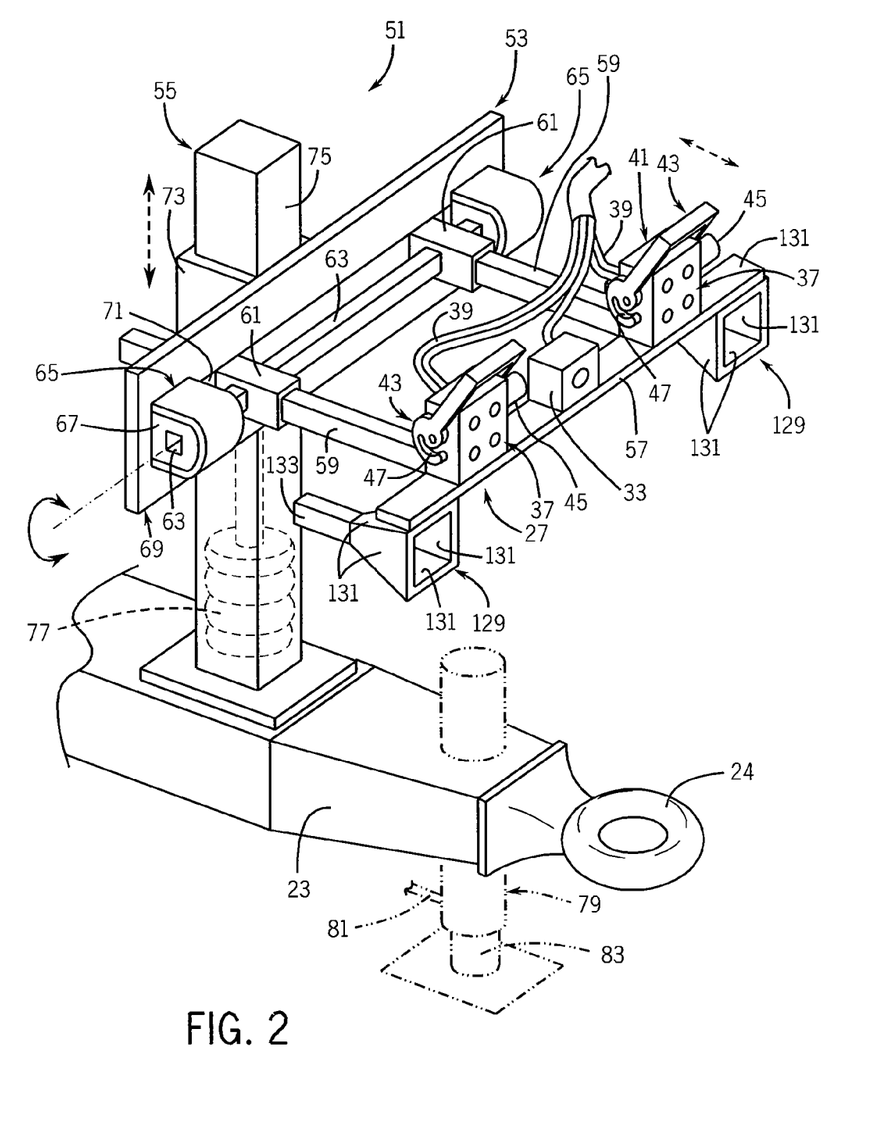
FIG. 2 is an isometric view of portions of the hitch system of FIG. 1.
Figure 3:
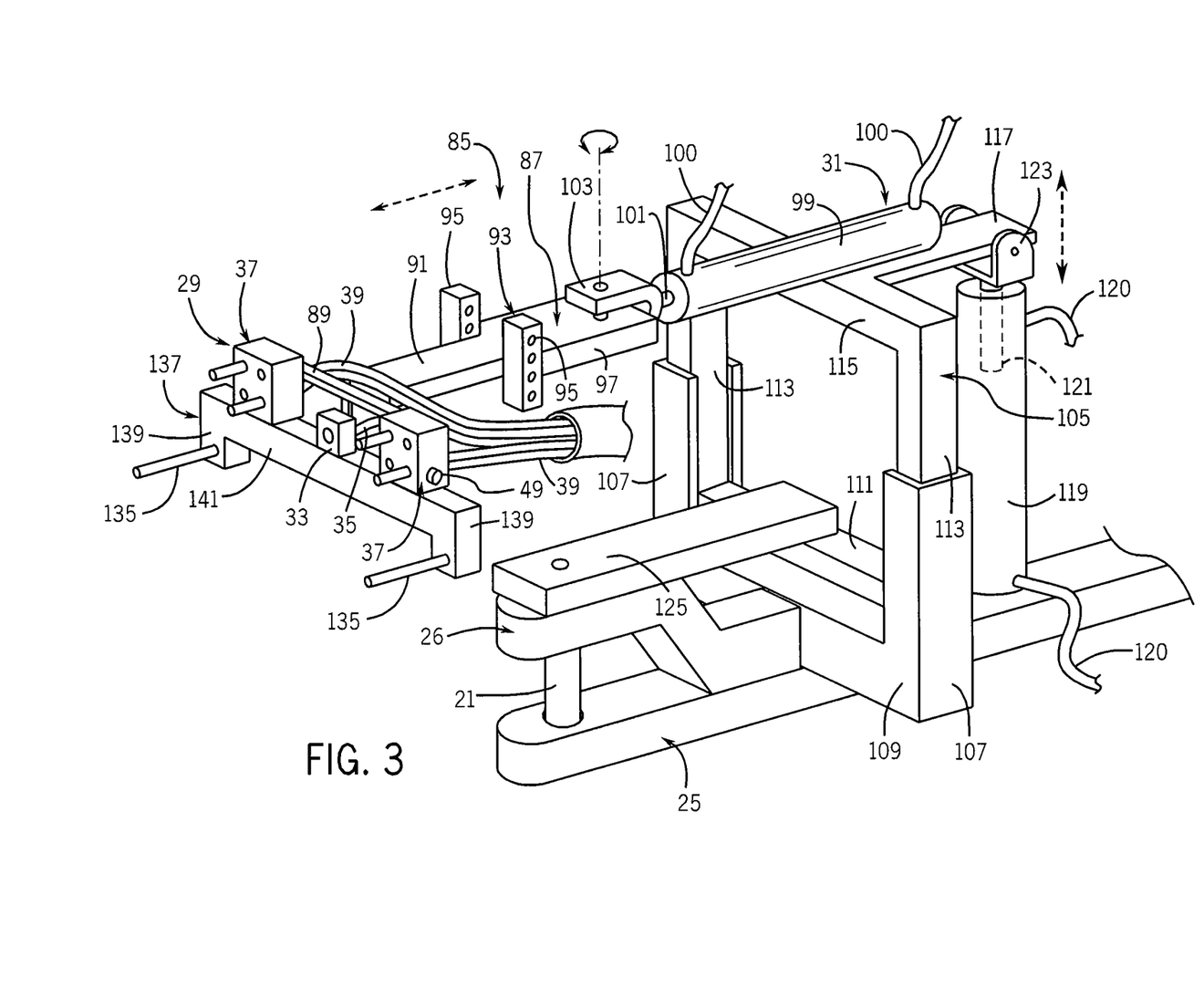
FIG. 3 is an isometric view of portions of the hitch system of FIG. 1.

Referring now to FIGS. 2 and 3, the implement and tractor connector bank assemblies 27, 29 each includes an electrical connector 33 that may be a 7-pin electrical connector known in the agricultural tractor industry, such as those used on the Case IH-Axial-Flow 2577 and 2588 combines and corresponding headers, available from CNH America LLC. Conductors 35 extend from the electrical connector 33 and are operably connected to the electrical system of the trailing implement 7. Each of the implement and tractor connector bank assemblies 27, 29, as shown, also includes a pair of hydraulic connectors 37 that are transversely spaced from each other and are provided on opposing sides of the electrical connector 33. Each hydraulic connector 37 may be a quick connect hydraulic connector known in the agricultural tractor industry, such as those used on the Case IH-Axial-Flow 2577 and 2588 combines and corresponding headers, available from CNH America LLC. Hydraulic lines 39 extend from the hydraulic connectors 37 and are operably connected to the hydraulic system of the trailing implement 7.

Referring again to FIG. 1, a lock system 41 is arranged on the implement and tractor connector bank assemblies 27, 29 to secure and hold the implement and tractor connector bank assemblies 27, 29 in operable connection with each other. As shown in FIG. 2, lock system 41, includes a clasp 43 that is mounted to each of the hydraulic connectors 37 of the implement connector bank assemblies 27. Each clasp 43 is driven by a motor 45 to pivot about a generally horizontal pivot axis that extends transversely through the hydraulic connector 37. Each clasp has a curved slot 47 that receives a post 49 (FIGS. 1 and 3) that extends from side wall(s) of the hydraulic connector 37 of the tractor connector bank assembly 29 while being driven to pivot by the motor 45 (FIG. 2).

As shown schematically in FIG. 1, the lock system 41 can be controlled remotely through the control system 6. Using the control system 6, an operator in the cab of the tractor 9 can energize the motor 45 (FIG. 2) to pivot the clasp 43 so as to actuate the lock system between an unlocked position. In the unlocked position of lock system 41, the implement and tractor connector bank assemblies 27, 29 are able to move with respect to each other. In the locked position of the lock system 41, the post 49 (FIG. 3) is fully seated at the end of the curved slot 47. This engagement of the curved slot 47 and post 49, when the lock system 41 is in the locked position, prevents separation of the implement and tractor bank assemblies 27, 29 until the clasp 43 is moved to the position that corresponds to the unlocked position of the lock system 41.

Referring now to FIG. 2, an implement support 51 is arranged between the implement connector bank assembly 27 and the trailing implement 7. Implement support 51 includes a bank frame 53 that holds the implement connector bank assembly 27 and a telescoping mount 55 that supports the bank frame 53. Bank frame 53 includes a brace 57 to which the electrical and hydraulic connectors 33, 37 are attached. A pair of slide rods 59 that are parallel to each other extend from opposing side portions of the brace 57, rearwardly toward the telescoping mount 55. A pair of slide collars 61 receives the slide rods 59 through longitudinally extending bores so that the slide rods 59 can move through the slide collars 61 to allow the implement connector bank assembly 27 to advance toward and regress from the telescoping mount 55, in fore and aft directions with respect to a longitudinal axis of the trailing implement 7.

Still referring to FIG. 2, the slide collars 61 are connected to each other through a pivot shaft 63 that extends transversely between the slide collars 61 and extends transversely beyond each of the slide collars 61. A pair of pivots 65 engages opposing ends of the pivot shaft 63 and allows the pivot shaft 63 to pivot therein. Each pivot 65 shown in FIG. 2 includes a block 67 that is made from a resilient, such as an elastomeric, material and has a rectangular bore that corresponds to a rectangular cross-sectional shape of, and that captures, the pivot shaft 63. This allows the pivot 65 to support the implement connector bank assembly 27 in a generally horizontally arranged resting state position while allowing the implement connector bank assembly 27 to deflect up or down through an arcuate movement path about the pivot by deforming the resilient material of the block 67 while the pivot shaft 63 rotates therein.

Still referring to FIG. 2, the pivots 65 are attached to a plate 69 that is parallel to the brace 57 and has a slot 71 through which the slide rods 59 extend that provides sufficient clearance for the slide rods 59 to pivot upwardly and downwardly. The plate 69 is attached to a collar 73 that surrounds and can move longitudinally along a post 75. A lower end of the post 75 is connected to and extends upwardly from the tongue 23 of the trailing implement 7. A spring 77 is housed in the post 75 and supports the collar 73 in a resting state position toward a middle portion of the post 75. This may be done be providing one or more slots (not shown) in a wall of the post 75 through which a pin (not shown) that is attached to the collar 73 extends into the interior of the post 75 to engage and be biasingly supported by the spring 77. This allows the collar 73 and thus the implement connector bank assembly 27 to move downwardly or upwardly along the post 75 while being urged toward a resting state position toward the middle portion of the post 75.

Referring now to FIGS. 1 and 2, the trailing implement 7 includes a tongue jack 79 that is mounted to the tongue 23 of the trailing implement 7. An electrical or hydraulic line 81 operably connects the tongue jack 79 to the control system 6 (FIG. 1) for remotely controlling the tongue jack 79 to control the height of the tongue 23 by moving a rod 83 into or out of the tongue jack 79, for example, electrically or hydraulically actuating the rod 83.

Referring now to FIG. 3, a tractor support 85 is arranged between the tractor connector bank assembly 29 and the tractor 9. Tractor support 85 includes a tractor bank frame 87 that holds the tractor connector bank assembly 29. The tractor bank frame 87 has a brace 89 to which the electrical and hydraulic connectors 33, 37 are attached, and a front bar 91 that extends rearwardly from the brace 89. The front bar 91 is mounted to a rack 93 assembly that has a pair of spaced-apart uprights 95. The uprights 95 of the rack have multiple vertically-spaced holes that allow the front bar 91 to be mounted at different heights with respect to the rack 93 assembly. A first end of a back bar 97 is connected to the rack assembly 93. The back bar 97 extends rearwardly from the rack assembly 93 to a second end of the back bar 97 that is pivotally mounted to the actuator assembly 31. The pivot attachment of the back bar 97 to the actuator assembly 31 allows the tractor connector bank assembly 29 to pivot sideways about a generally vertical pivot axis. An elastomeric bushing may be provided at the attachment between the back bar 97 and the actuator assembly 31 and which allows the tractor connector bank assembly 29 to pivot up and down in addition to sideways.

Referring now to FIGS. 1 and 3, the actuator assembly 31 allows the tractor connector bank assembly 29 to move along a first movement path and a second movement path that is different from and is shown as generally orthogonal with respect to the first movement path by the dashed-line arrows. The actuator assembly 31 includes a first actuator 99 that is shown as being a hydraulic ram with hydraulic lines 100 that are operably connected to the control system 6 (schematically shown in FIG. 1) so that the first actuator 99 can be controlled remotely from an operator within the cab of the tractor 9. The first actuator 99 is shown as arranged in a generally horizontal direction so that a movable rod 101 of the first actuator 99 can move in fore and aft directions along a longitudinal axis of the tractor 9. A clevis 103 is attached to an end of the rod 101 so that the clevis 103 and rod 101 move in unison with each other. The clevis 103 is connected to the rearward end of the back bar 97 to provide the pivot connection between the tractor bank frame 87 and the actuator assembly 31.

Still referring to FIGS. 1 and 3, the first actuator 99 is mounted to a telescoping frame 105 that can move upwardly and downwardly with respect to the drawbar 25 of the tractor 9 as guided by a pair of generally vertically extending spaced-apart guides 107 that are connected to each other by a base 109. As shown in FIG. 3, the guides 107 of this implementation have C-shaped profiles that engage opposing sides of the telescoping frame 105. The telescoping frame 105 includes a lower brace 111 and a pair of uprights 113 that extend parallel to each other and upwardly from opposing sides of the lower brace 111 and slidingly nest within cavities of the guides 107. An upper brace 115, to which the first actuator 99 is attached, extends parallel to the lower brace 111 and connects upper ends of the uprights 113 to each other. A bracket 117 extends rearwardly from the upper brace 115, toward the tractor 9 and is connected to a second actuator 119. The second actuator 119 is shown as being a hydraulic ram with hydraulic lines 120 that are operably connected to the control system 6 (schematically shown in FIG. 1) so that the second actuator 119 can be controlled remotely from an operator within the cab of the tractor 9. The second actuator 119 is shown as arranged in a generally vertical direction so that a movable rod 121 of the second actuator 119 can move in upward and downward directions, generally orthogonally with respect to movement directions of the first actuator 99. A clevis 123 is attached to an end of the rod 121 so that the clevis 123 and rod 121 move in unison with each other. The clevis 123 is connected to a rearward end of the bracket 117 so that movement of the rod 121 and clevis 123 is translated into movement of the bracket 117, the telescoping frame 105 and the first actuator 99 and tractor connector bank assembly 29 that are supported by the telescoping frame 105.

Still referring to FIGS. 1 and 3, in this embodiment, the second actuator 119 provides movement of the hitch pin 21 in addition to movement of the tractor connector bank assembly 29. Hitch pin 21 is connected to an end of a pin mount 125 and an opposing end of the pin mount 125 is connected to the lower brace 111 of the telescoping frame 105. In this way, when the telescoping frame 105 is moved by the second actuator 119, the pin mount 125 and pin 21 move in unison with the telescoping frame. This allows the pin 21 to be moved to a fully retracted position as shown in FIG. 1 to a fully inserted position as shown in FIG. 3 and in which the pin extends through aligned holes in a clevis 26 of the drawbar 25. It is understood that the actuator assembly 31 may include another actuator that is controlled through control system 6 and that moves the pin 21 without simultaneously moving the tractor connector bank assembly 29.

Referring again to FIG. 1, an alignment system 127 is arranged with respect to the implement and tractor connector bank assemblies 27, 29 to facilitate alignment and engagement thereof during a hitching procedure that allows for locking of the implement and tractor connector bank assemblies 27, 29 to each other by way of the lock system 41. As shown in FIG. 2, alignment system 127 includes a pair of receptacles 129 that are spaced from each other and provided transversely outwardly beyond the electrical and hydraulic connectors 33, 37 of the implement connector bank assembly 27. Each receptacle 129 includes interconnected side walls 131 that collectively taper and converge toward each other in a funnel-like shape. Upper side walls 131 of the receptacles 129 are connected to the brace 57 so that the receptacles are suspended, hanging below the implement connector bank assembly 27. Tubes 133 extend from the tapered ends of the receptacles 129, each tube 133 aligned with a central longitudinally extending axis of the respective receptacle 129.

As shown in FIG. 3, alignment system 127 includes a pair of pins 135 that are spaced from each other and provided transversely outwardly beyond the electrical and hydraulic connectors 33, 37 of the tractor connector bank assembly 29. Referring to FIGS. 1 and 3, each pin 135 has an outer diameter that corresponds to an inner diameter of the tube(s) 133 of the receptacle 129 so that each pin 135 can slide through the respective tube 133 so as to align the implement and tractor connector bank assemblies 27, 29 with each other. Referring again to FIG. 3, the pins 135 are connected to a pin frame 137 that includes a pair of uprights 139 at opposing sides of the pin frame 137 and a brace 141 that extends between and connects upper ends of the uprights 139. FIG. 1 shows the pin frame 137 connected to the bottom of the rack 93, whereas FIG. 3 shows the pin frame 137 connected to the bottom of tractor connector bank assembly 29. Regardless of which component the pins 135 and pin frame 137 are connected to, the pins 135 and receptacles 129 cooperate within the alignment system 127 to allow the implement and tractor connector bank assemblies 27, 29 to automatically align with and engage each other while an operator remotely controls the hitch system 5 from inside the cab of the tractor 9 with the control system 6.

Referring again to FIG. 1, control system 6 is shown as having a controller 143 that can include an industrial computer or, e.g., a programmable logic controller (PLC), along with corresponding software and suitable hardware for controlling electronic or electro-mechanical components of the hitch system 5, and can also include valve assemblies for controlling hydraulic components of the hitch system 5. A user console 145 is operably connected to the controller 141 and includes a user interface such as indicator lights, a display, buttons, switches, and/or levers that can be manipulated by the operator to control movements of the actuator assembly 31 and hitch pin 21 remotely, and monitor conditions of system components, from within the cab of the tractor 9.

In light of the above, to use the hitch system 5 during a hitching procedure, an operator backs and maneuvers the tractor 9 toward the implement 7. The components of hitch system 5 are within a clear line of sight of the operator while the operator is in the cab of the tractor 9. This allows the operator to look at the receptacles 129 and pins 135 as guidance markers and alignment tools. The operator moves the tractor 9 so that the pins 135 are transversely aligned within the forward facing openings of the receptacles 129. The operator stops the tractor 9 and uses a control, which may be a button(s), switch(es), and/or lever(s), of the user console 145 to manipulate the actuator assembly 31. The operator raises or lowers the tractor connector bank assembly 29 to vertically align the tractor connector bank assembly 29 with the implement connector bank assembly 27. This is done by manipulating a control of the user console 145 to move the rod 121 of the second actuator 119 upward or downward so as to move the pins 135 upward or downward until the pins 135 are at the same height(s) as the receptacles 131. After the receptacles 129 and pins 135 are transversely and vertically aligned with each other, the operator moves the tractor connector bank assembly 29 toward the implement connector bank assembly 27. This is done by manipulating a control of the user console 145 to move the rod 101 of the first actuator 99 in an aft direction, which moves the tractor connector bank assembly 29 away from the tractor 9. When the tractor bank assembly 29 moves toward implement connector bank assembly 27, the pins 135 enter the forward facing openings of the receptacles 129 and while the pins 135 advance through the receptacles, the implement and tractor connector bank assemblies 27, 29 automatically align with each other because of the mechanical engagement of the pins 135 and receptacles 129.

Referring again to FIGS. 1 and 3, transverse and sideways angular or yaw alignment of the implement and tractor bank assemblies 27, 29 is automatically achieved by the pins 135 sliding across the transversely spaced pairs of side walls 131 that guide the pins, side-to-side, into the tubes 133 at the backs of the receptacles 129. As the pins 135 are guided into the tubes 133, the reducing widths of the openings through the receptacles 129 force the tractor connector bank assembly 29 to pivot about the pivot connection between the clevis 103 of the first actuator 99 and the tractor bank frame 87 so as to automatically transversely and angularly align the pins 135 with the tubes 133 and thus also the implement and tractor connector bank assemblies 27, 29 with each other.

Referring again to FIGS. 1 and 2, vertical and up/down angular or pitch alignment of the implement and tractor bank assemblies 27, 29 is automatically achieved by the pins 135 sliding across the vertically spaced pairs of side walls 131 that guide the pins, from above and below, into the tubes 133 at the backs of the receptacles 129. As the pins 135 are guided into the tubes 133, the reducing heights of the openings through the receptacles 129 force the implement connector bank assembly 27 to pivot about the pivots 63 and urge the collar 73 up or down the post 75 of the telescoping mount 55. Doing so automatically vertically and up/down angularly or pitch aligns the pins 135 with the tubes 133 and thus also the implement and tractor connector bank assemblies 27, 29 with each other.

Referring again to FIG. 1, as the pins 135 are fully inserted into the tubes 133, the electrical and hydraulic connectors 33, 37 of the implement and tractor connector bank assemblies 27, 29 are substantially aligned with each other, to an extent that corresponds to the sizes of the concentric clearances between the pins 135 and tubes 133. As the first actuator 99 continues to push the tractor connector bank assembly 29 toward the implement connector bank assembly 27, the implement and tractor connector bank assemblies 27, 29 engage each other, and the electrical and hydraulic systems 11, 15, and 13, 17 of the implement 7 and tractor 9 are connected to each other. The operator uses a control of the user console 145 to manipulate the lock system 41 so as to energize the motor 45 (FIG. 2) that rotates the clasp 43 and locks the implement and tractor connector bank assemblies 27, 29 to each other.

Still referring to FIG. 1, still from within the cab of the tractor 9, the operator adjusts the height of the tongue 23 of the implement 7 to vertically align within the clevis 26 of the tractor drawbar 25. This is done by using a control of the user console 141 that is operably connected to the tongue jack 79 to adjust the height of the tongue 23. The operator then uses a control of the user console 145 to place the first actuator 99 into a float mode that allows the cylinder to collapse and the rod 101 to freely move. The operator backs the tractor 9 toward the implement until a ring 24 of the implement tongue 23 is within the clevis 26 of the tractor drawbar 25. The operator then stops the tractor and uses a control of the user console 141 to lower the pin 21 through the clevis 26 of the drawbar 25 and ring 24 of the tongue 23, by lowering the rod 121 of the second actuator 119. Once this is done, the operator may use a control of the user console 141 to fully retract the rod 83 of the tongue jack 79 so that it is no longer contacting the ground and the full weight of the implement is now supported by the tractor drawbar 25. In this way, the implement 7 was hitched to the tractor 9 and corresponding electrical and hydraulic connections were made without the operator leaving the cab of the tractor and without requiring manual connections from an assistant, on the ground. To unhitch the implement 7 from the tractor 9, the above tasks that are performed during the hitching procedure are performed in reverse order.

Regardless, after the implement and tractor connector bank assemblies 27, 29 have been connected to each other, the hitch system 5 allows for a substantial amount of relative movement between the implement 7 and tractor 9 without compromising the connection(s) between the implement and tractor connector bank assemblies 27, 29. The same multiple degrees of movement freedom within the hitch system 5 that facilitate the automatic self-alignment hitch system 5 components during a hitching procedure also allow the connected implement and tractor connector bank assemblies 27, 29 to float as a unit between the implement 7 and tractor 9 during use, while the implement 7 and tractor 9 move with respect to each other.

For example, during use the tractor 9 goes over soil profile abnormalities such as hills, undulations, cross ditches, headlands, and/or others, before the trailing implement 7 reaches the same soil profile(s), whereby the implement 7 and tractor 9 may experience substantial movements relative to each other. The slide rods and collars 59, 61, and/or a float mode of a hydraulic ram version of the first actuator 99, may accommodate relative longitudinal movements of the implement 7 and tractor 9, for example longitudinal movements of the implement and tractor supports 51, 85, with respect to each other. Since the implement 7 and tractor 9 are hitched to each other during use, any such relative longitudinal movements between the implement and tractor supports 51, 85 typically correspond to changes in pitch or up and down angular position between the implement 7 and tractor 9, which may also be accommodated by the pivots 65 that allow for up and down pivoting of the slide collars 61 about a horizontal pivot axis. This may also be accommodated at least in part by the elastomeric bushing provided at the attachment between the back bar 97 and the clevis 103 of the first actuator 99 of the actuator assembly 31 that allows the back bar 97 to pivot up and down, at least to some extent, in addition to sideways pivot movement within the clevis 103. The sideways pivot movement of the back bar 97 within the clevis 103 of the first actuator 99 may accommodate side to side angular position changes between the implement 7 and tractor 9, such as those imposed during steering. Relative rolling movements, about a longitudinal axis, between the implement 7 and tractor 9 may be accommodated by the ability of the rod 101 to rotate within the first actuator 99. Such degrees of freedom of movement are not mutually exclusive, whereby in combination, they can dynamically accommodate highly complex and compound relative movements between the implement 7 and tractor 9 while driving over uneven terrain.

Many changes and modifications could be made to the invention without departing from the spirit thereof. The scope of these changes will become apparent from the appended claims.

The invention claimed is:

1. A hitch system for automatically hitching a tractor to a trailing implement, comprising:
    an implement connector bank assembly that includes an electrical connector and a hydraulic connector that are respectively connected to an electrical system and a hydraulic system of an implement that can be hitched to and trail behind a tractor;
    a tractor connector bank assembly that includes an electrical connector and a hydraulic connector that are respectively connected to an electrical system and a hydraulic system of the tractor;
    an actuator assembly that can be operated remotely, the actuator assembly including a first actuator arranged between the tractor and the tractor connector bank assembly for moving the tractor connector bank assembly vertically along a first movement path for aligning the tractor connector bank assembly with the implement connector bank assembly without moving the tractor and a second actuator arranged between the tractor and the tractor connector bank assembly for moving the tractor connector bank assembly along a second movement path that differs from the first movement path so as to couple the electrical connector and the hydraulic connector of the tractor connector bank assembly to the electrical connector and the hydraulic connector, respectively, of the implement connector bank assembly.

2. The hitch system of claim 1 wherein the first and second movement paths of the tractor connector bank assembly are generally orthogonal with respect to each other.

3. The hitch system of claim 2 wherein the second movement path extends in a generally horizontal direction.

4. The hitch system of claim 3 wherein the second actuator has an inward position in which the tractor connector bank assembly is spaced relatively closer to the tractor and an outward position in which the tractor connector bank assembly is spaced relatively further from the tractor.

5. The hitch system of claim 4 wherein the tractor includes a drawbar and wherein the first actuator has a lowered position in which the tractor connector bank assembly is spaced relatively closer to the drawbar of the tractor and a raised position in which the tractor connector bank assembly is spaced relatively further from the drawbar of the tractor.

6. A hitch system for automatically hitching a tractor to a trailing implement, comprising:
    an implement connector bank assembly that includes at least one of an electrical connector that is operably coupled to an electrical system of an implement that can be hitched to and trail behind a tractor and a hydraulic connector that is operably coupled to a hydraulic system of the implement that can be hitched to a drawbar of the tractor and trail behind the tractor;
    a tractor connector bank assembly that includes at least one of an electrical connector that is operably coupled to an electrical system of the tractor and a hydraulic connector that is operably coupled to a hydraulic system of the tractor, wherein the tractor connector bank assembly is movable separately from the tractor to selectively engage the implement connector bank assembly for operably coupling at least one of the electrical and hydraulic systems of the implement and tractor to each other; and
    a first actuator arranged between the tractor connector bank assembly and the tractor for moving the tractor connector bank assembly in a generally horizontal direction so as to advance the tractor connector bank assembly toward or retract the tractor connector bank assembly from the implement connector bank assembly, the first actuator having an inward position in which the tractor connector bank assembly is spaced relatively closer to the tractor and an outward position in which the tractor connector bank assembly is spaced relatively further from the tractor; and
    a second actuator arranged between the tractor connector bank assembly and the tractor for moving the tractor connector bank assembly in a generally vertical direction so as to vertically align the tractor connector bank assembly with the implement connector bank assembly, the second actuator having a lowered position in which the tractor connector bank assembly is spaced relatively closer to the drawbar of the tractor and a raised position in which the tractor connector bank assembly is spaced relatively further from the drawbar of the tractor.

7. The hitch system of claim 6 further comprising an implement support that is arranged between a tongue of the implement and the implement connector bank assembly, the implement support including an implement bank frame that holds the implement connector bank assembly and a telescoping mount that interconnects the implement bank frame and the implement and allows the implement bank frame to move in a generally vertical direction.

8. The hitch system of claim 7 wherein the telescoping mount of the implement support includes a post having a first end that is connected to a tongue of the implement and a collar that can move in a longitudinal direction along the post and wherein the implement bank frame is connected to the collar for movement in unison therewith.

9. The hitch system of claim 8 wherein the collar of the telescoping mount of the implement support is movable between an uppermost position and a lowermost position and wherein the telescoping mount of the implement support includes a spring that supports the collar in a resting state position that is between the uppermost and lowermost positions of the collar.

10. The hitch system of claim 8 wherein the implement support includes a slider that is arranged between the collar and the implement bank frame for allowing the implement bank frame to translate closer to or further from the post of the telescoping mount.

11. The hitch system of claim 8 wherein the implement support includes a pivot that is arranged between the collar and the implement bank frame for allowing the implement bank frame to pivot with respect to the post of the telescoping mount.

12. The hitch system of claim 11 wherein the pivot includes a resilient material that can bend to accommodate pivot movement of the implement bank frame.

13. The hitch system of claim 6 further comprising a tractor support that is arranged between the tractor and at least one of the tractor connector bank assembly and the first and second actuators, the tractor support including a tractor bank frame that holds the tractor connector bank assembly and a pivot arranged between the tractor bank frame and tractor that allows the tractor bank frame to pivot with respect to the tractor.

14. The hitch system of claim 6 further comprising a hitch pin assembly that includes a pin and a pin actuator connected to the pin and that is arranged with respect to the drawbar of the tractor to move the pin into and out from a hole in the drawbar of the tractor.

15. The hitch system of claim 14 wherein the pin actuator is the second actuator that moves the tractor connector bank assembly closer to and further from the drawbar of the tractor.

16. The hitch system of claim 6 wherein at least one of the first and second actuators is a hydraulic ram.

17. The hitch system of claim 6 further comprising a lock system that is arranged between the implement and tractor connector bank assemblies, the lock system having an unlocked position in which the implement and tractor connector bank assemblies are moveable with respect to each other and a locked position in which the implement and tractor connector bank assemblies are held in engagement with each other.

18. The hitch system of claim 17 wherein the lock system includes a clasp that pivots about an axis to draw the implement and tractor connector bank assemblies toward each other and an electric motor that drives the clasp to pivot about the axis.

19. A hitch system for automatically hitching a tractor to a trailing implement, comprising:
  an implement connector bank assembly that includes an electrical connector that is operably connected to an electrical system of an implement that can be hitched to a drawbar of and trail behind a tractor, and a pair of hydraulic connectors that are operably connected to a hydraulic system of the implement;
  an implement bank frame that supports the implement connector bank assembly;
  a telescoping mount arranged between the implement bank frame and a tongue of the implement, the telescoping mount supporting the implement connector bank frame for allowing the implement connector bank assembly to move in a generally vertical direction with respect to the tongue of the implement;
  a first pivot arranged between the implement bank frame and the telescoping mount for allowing the implement connector bank assembly to pivot with respect to the tongue of the implement;
  an tractor connector bank assembly that includes an electrical connector that is operably connected to an electrical system of the tractor and a pair of hydraulic connectors that are operably connected to a hydraulic system of the tractor, the implement and tractor connector bank assemblies being adapted to engage each other for connecting the electrical and hydraulic systems of the implement and the tractor to each other;
  a tractor bank frame that supports the tractor connector bank assembly;
  an actuator assembly that can be operated remotely by an operator on the tractor, the actuator assembly arranged between the tractor and the tractor bank frame so as to move the tractor connector bank assembly along a first movement path and a second movement path that is different from the first movement path for aligning the tractor connector bank assembly with the implement connector bank assembly independently of movement of the tractor, the actuator assembly including a first hydraulic ram that has an inward position in which the tractor connector bank assembly is spaced relatively closer to the tractor and an outward position in which the tractor connector bank assembly is spaced relatively further from the tractor, and a second hydraulic ram that has a lowered position in which the tractor connector bank assembly is spaced relatively closer to the drawbar of the tractor and a raised position in which the tractor connector bank assembly is spaced relatively further from the drawbar of the tractor, wherein movement of the first and second hydraulic rams of the actuator assembly can align and engage the implement and tractor connector bank assemblies with each other without moving the tractor;
  a second pivot arranged between the tractor bank frame and the actuator assembly for allowing the tractor connector bank assembly to pivot with respect to the tractor, wherein the first and second pivots define respective pivot axes that are arranged generally perpendicular to each other;
  an alignment system that includes a pair of pins and a pair of receptacles that are arranged with respect to the implement and tractor connector bank assemblies so that engagement of the pairs of pins and receptacles during movement of the implement and tractor connector bank assemblies toward each other forces aligning movement of the implement and tractor connector bank assemblies for engagement therebetween;

a lock system that is arranged between the implement and tractor connector bank assemblies, the lock system including a clasp and an electric motor that selectively moves the clasp between a first position that corresponds to a locked position of the lock system in which the implement and tractor connector bank assemblies are secured to each other and a second position that corresponds to an unlocked position of the lock system in which the implement and tractor connector bank assemblies can move with respect to each other; and a hitch pin that is connected to and actuated by the actuator assembly for allowing the operator on the tractor to remotely insert the hitch pin through the tongue of the implement and the drawbar of the tractor.

20. The hitch system of claim 19 wherein the hitch pin is connected to the second hydraulic ram of the actuator assembly so that the hitch pin and tractor connector bank assembly move in unison with each other.

\* \* \* \* \*